Figure 4:
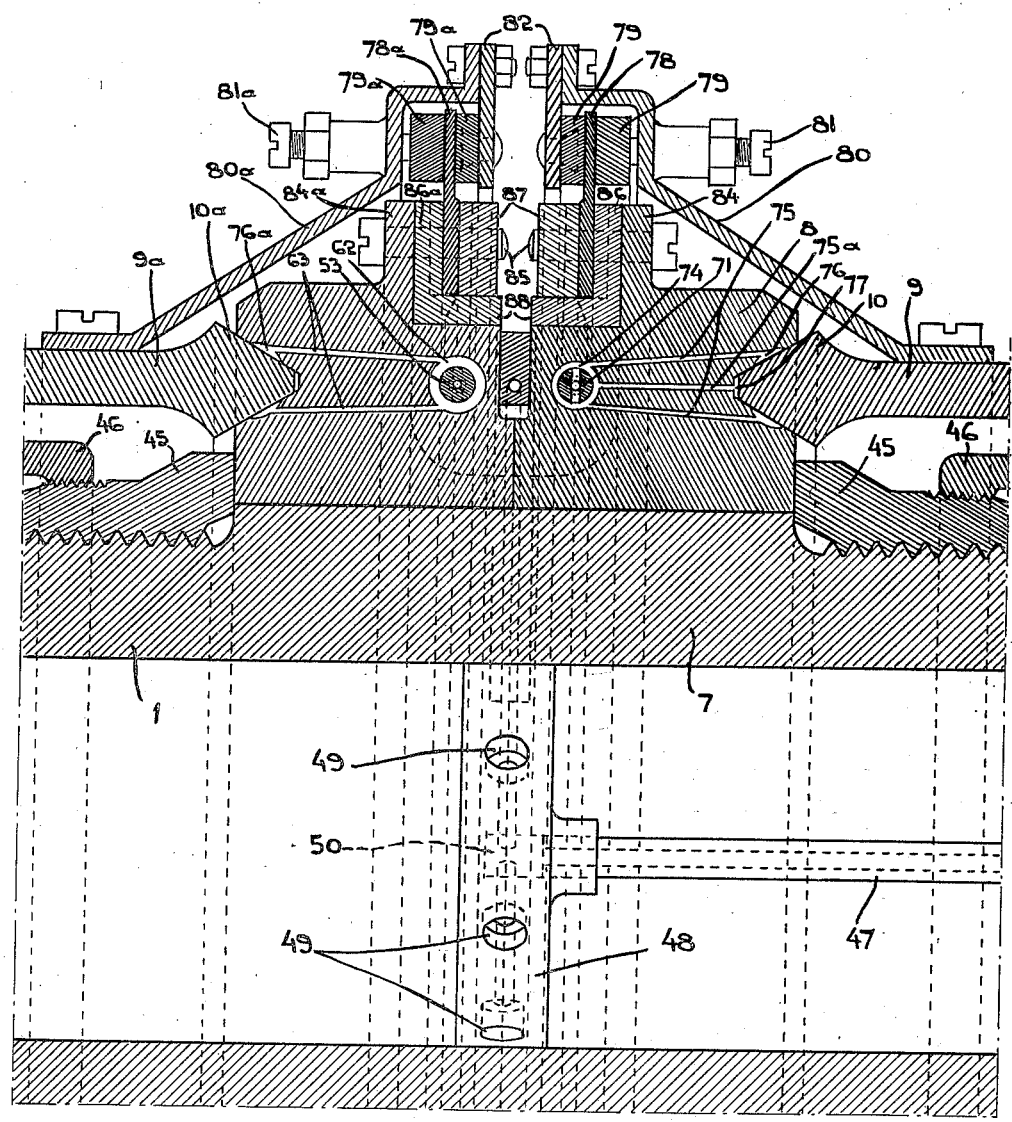

May 21, 1940.  O. HANSSON  2,201,264
TRANSMISSION
Filed Dec. 10, 1936  4 Sheets-Sheet 1
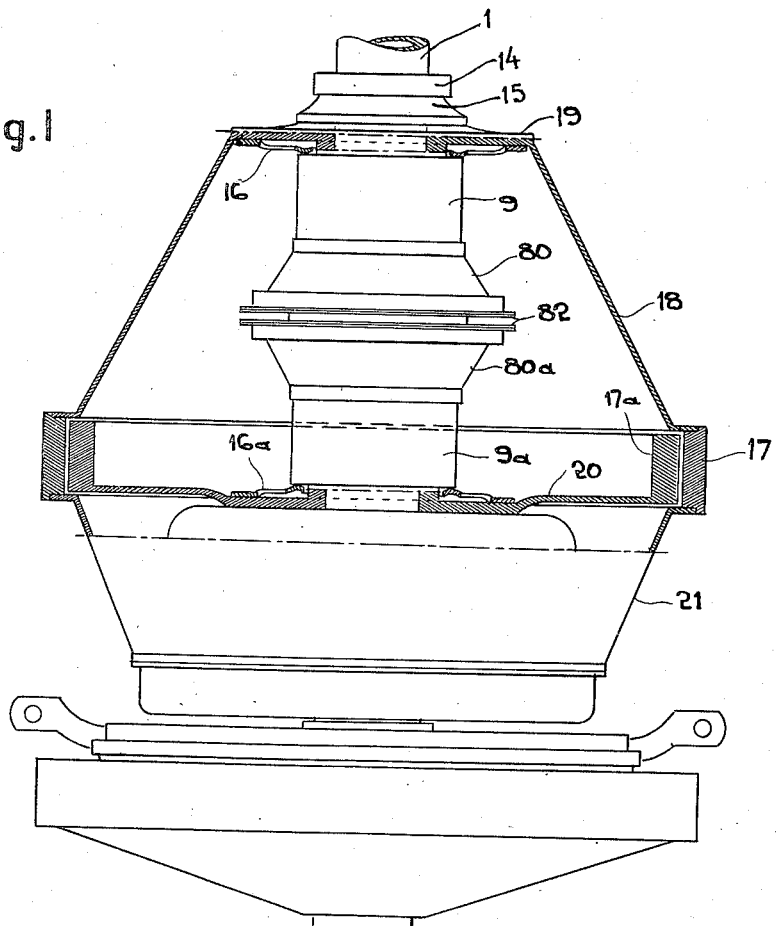
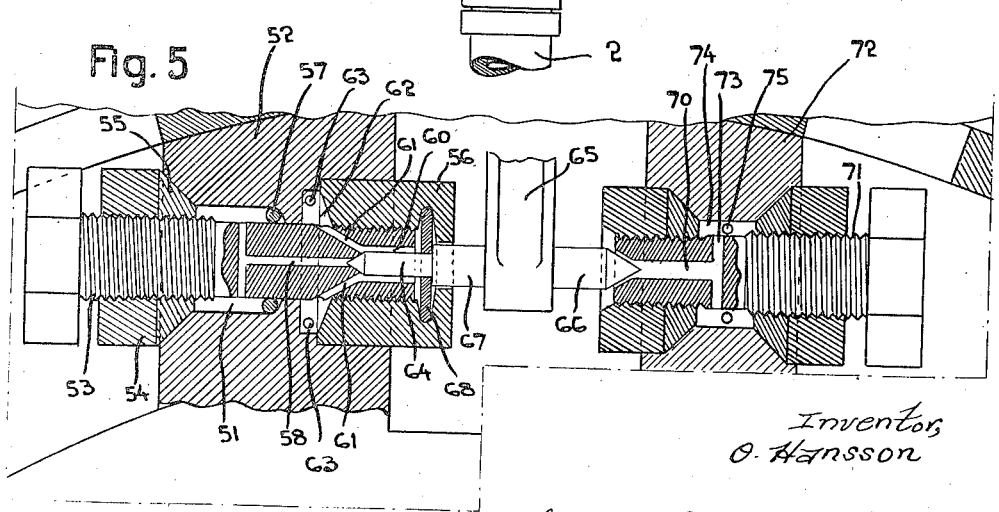
Inventor,
O. Hansson
By Glascock Downing & Seebold
Attys.

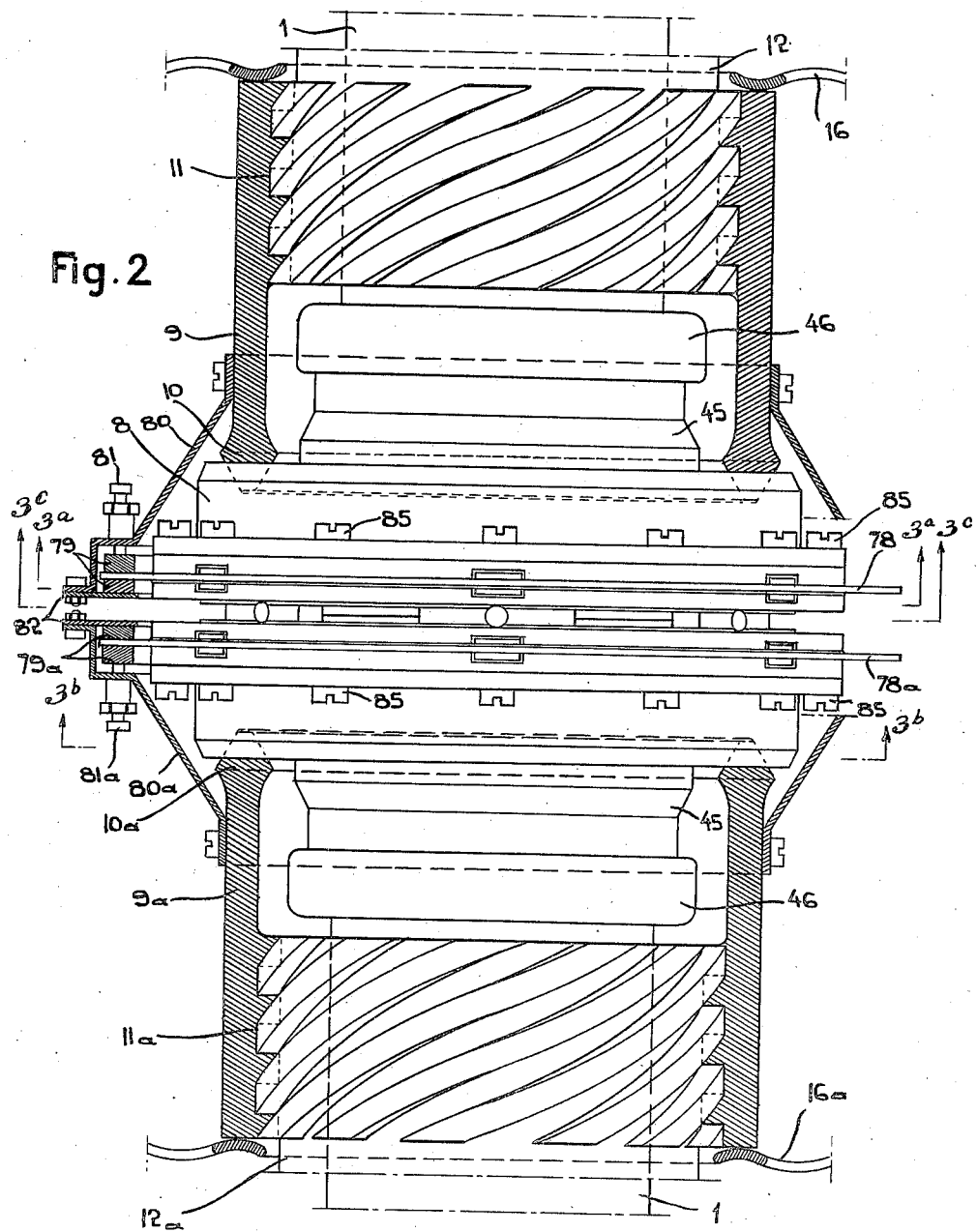

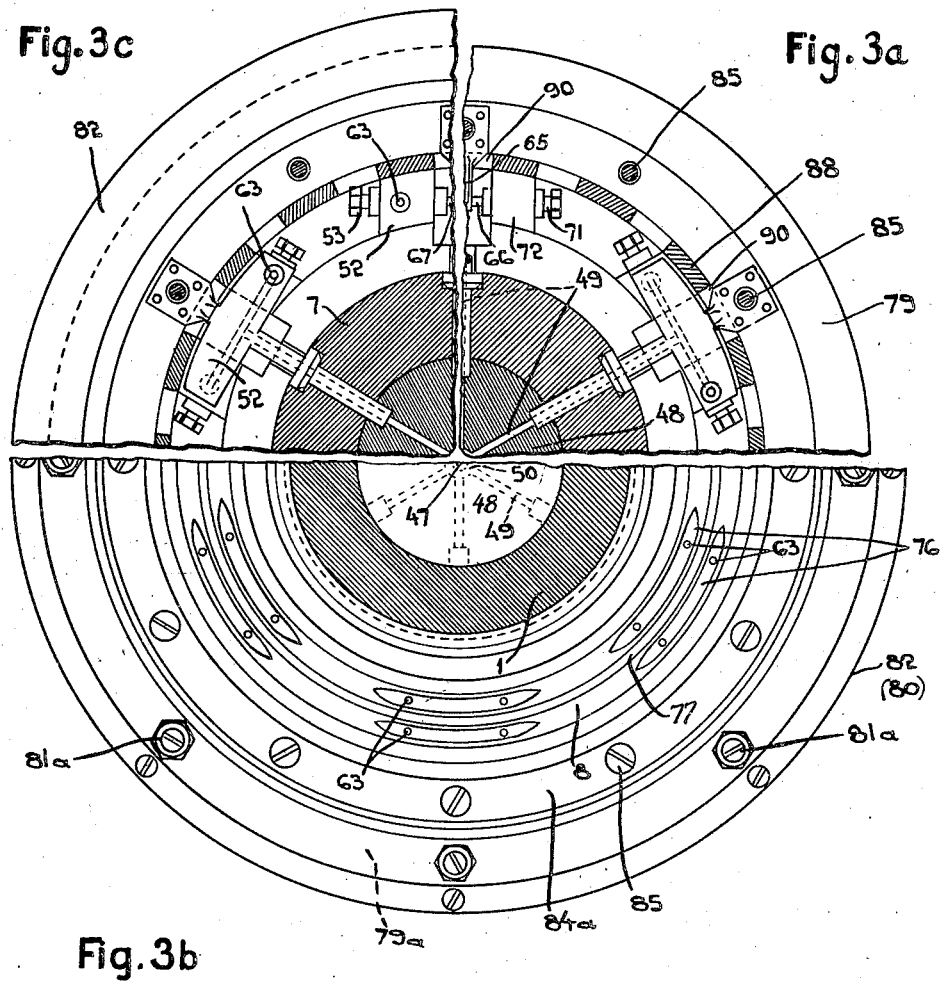

Patented May 21, 1940

2,201,264

UNITED STATES PATENT OFFICE 2,201,264

TRANSMISSION

Oscar Hansson, Askim, Sweden, assignor to Aktiebolaget Motorus, Goteborg, Sweden Application December 10, 1936, Serial No. 115,247
In Sweden December 10, 1935

10 Claims. (Cl. 74—126)

The present invention relates to power transmission means and the object thereof is to convert oscillatory movement into uni-directional rotary movement. Such means are useful for various purposes, and the present invention, therefore, is not restricted to use in connection with any particular kind of machines. The specific embodiment of the present invention illustrated in the accompanying drawings and described in detail here below, is intended for the specific purpose of driving the screw propeller of a boat or an aeroplane from an engine having an oscillating movement.

The problem of converting an oscillatory movement into a uni-directional rotary movement can be solved in various ways, for example by the known use of ratchets or similar mechanisms which operate in one direction only but are inoperative when moving in the opposite direction. The unavoidable noise which arises from the use of such clutch means can be avoided by substituting frictional couplings which are made so that they grip the part which is to be rotated in one direction when the oscillating member moves in one direction, but release the same member when moving in the opposite direction. Such friction clutches, however, have the disadvantage that the two members of the clutch when they are not in engagement with each other, must be moved apart comparatively widely in order to free them, which causes considerable but unavoidable shocks on the parts, but when they engage such a wide displacement requires considerable acceleration in order to bring the two members into contact as quickly as possible so as to avoid slipping between the coupling members or the coupling parts must be only slightly separated which gives rise to the still greater danger of gripping or holding owing to the friction surfaces having insufficient clearance.

An object of the present invention is to provide a clutch for converting oscillatory movement into uni-directional rotary movement in which the clutch operates without danger of holding when the oscillating member moves in the direction opposite to that of the revolving member, and the danger of shocks or undue stresses are avoided when the two members are brought into contact.

A principal feature of this invention is that the friction clutch consists of two main members, one of which is rigidly joined to the oscillating member of the engine so that it must follow the oscillations of said engine. The other main member is flexibly joined to the machine which is to be uni-directionally rotated, by means of an arrangement such as screw thread, in such a way that the oscillating member carries the rotating member with it when the flexible clutch member moves in one direction, but is separated therefrom, when the flexible member moves in the opposite direction or remains stationary. The two clutch members are forced into contact by means of a spring and by the action of the aforesaid screw threads when the oscillating member moves in the operative direction, and they are separated from one another by the pressure of a medium, such as compressed gas or a liquid which by special means is intermittently forced in between the cooperating surfaces of the two clutch members so as to separate them, when the oscillating member moves in the inoperative direction.

Regardless of the range of usefulness of this invention it is believed necessary to describe only a special embodiment thereof, and for that purpose the annexed drawings illustrate only the principal parts of the clutch which are necessary to understand the construction of the invention, and how it operates.

In the drawings:

Figure 1 shows in elevation a complete clutch of the class mentioned with that portion which specifically belongs to this invention shown in section, Figure 2 shows on an enlarged scale a partial axial sectional view of the improved parts of the clutch, Figures 3a, 3b, and 3c are partial sections taken respectively, along the lines 3a—3a, 3b—3b and 3c—3c of Figure 2. The planes of these three sectional views approximately follow the same section lines but some parts are removed to afford a better understanding of the essential parts of the construction, Figure 4 is a longitudinal sectional view of the middle portion of Figure 2 on a still greater enlarged scale, Figure 5 is a fragmentary longitudinal sectional view of a pair of controlling valves taken in a plane perpendicular to that of Figure 4, and on a further increased scale.

Referring to the drawings in detail, 1 represents a hollow shaft which is oscillated by an oscillating engine, and 2 represents another hollow shaft in which the oscillations are converted into uni-directional rotary motion. The hollow shafts 1 and 2 are not directly connected, but the movement of the oscillating driving shaft is transmitted to the driven shaft 2 by means of the improved clutch.

On a wider part 7 of the shaft 1, an annular member 8 is secured by any convenient means such as keys or studs (not shown in the drawings) and constitutes one part of the frictional clutch which follows the oscillations of the shaft 1 because of its said rigid connection to shaft 1 and accordingly this member will be referred to herein after as "the oscillating clutch member". According to the illustrated embodiment of this invention and for reasons given in the following, the oscillating clutch member 8 is double ended, that is, the left hand end and the right hand end are exactly the same and both operate alike. The two ends are provided with tapered grooves so as to co-operate with other clutch members 9 and 9a. These last mentioned members are formed as sleeves, and the ends thereof which face the oscillating clutch member 8, have enlargements 10 and 10a which are wedge-shaped in cross section to correspond with the tapered grooves in the ends of member 8. The two clutch members 9 and 9a will be referred to hereinafter as "intermittently operated clutch members".

The two intermittently operated clutch members 9, 9a are provided with internal screw threads 11, 11a, each co-operating with external screw threads on sleeves 12, 12a which rotate freely on the shaft 1 by means of white metal bushings or like bearings (not shown). Ring nuts 15 secured on each end of the shaft 1 by lock nuts 14 prevent the sleeves 12, 12a from increasing their mutual distance, while their approach is prevented by the co-operation of the clutch members 8, 9 or 9a as well as the screw threads 11, 11a and spring washers 16, 16a respectively. In the drawing (Figure 1) the nuts 14 and 15 are visible only at the one end of shaft adjacent the sleeve 12, because similar nuts on shaft 1 for the sleeve 12a are obscured by the parts shown in elevation.

The sleeve 12 is connected with a fly wheel rim 17 by a conical casing 18 secured to the sleeve 12 by a flange 19 and constitutes a protecting cover around the clutch members 8, 9, 9a, and the sleeve 12a is provided with a similar fly wheel rim 17a disposed within the rim 17 coaxial therewith and secured to the sleeve 12a by a web 20.

Another conical casing 21 extends from the opposite side of the fly wheel rim 17 and encloses parts provided to transmit the motion from the aforesaid clutch members to the driven shaft 2. These parts, however, do not form part of this invention, and therefore they are neither shown nor described in detail.

The oscillating clutch member 8 is secured to shaft 1 by annular nuts 45 and lock nuts 46, and its provided with means for controlling the admission and exhaust of a fluid under pressure, the object of which is to act intermittently between the operative end surfaces of said clutch member 8 and each of the two intermittently operative members 9 and 9a. This device is shown in detail in the Figures 4 and 5 though it is visible to some extent in Figures 2 and 3 also. The device for controlling the admission of fluid comprises a supply pipe 47 for the pressure medium which is introduced through the central bore of the oscillating shaft 1, and terminates in a disc 48 in said bore, said disc being provided with a plurality of radial conduits 49 (in Figure 3 six such conduits are shown); these conduits 49 extend from a central chamber 50 in the disc 48 into which chamber the pipe 47 discharges. Each conduit 49 terminates in a circular chamber 51 in a shoulder 52 of the clutch member 8 and said circular chamber 51 is traversed by a screw threaded bolt 53 having at the one end a lock nut 54 with a packing washer 55 and at the opposite end a stuffing box gland 56 which renders the circular chamber 51 air tight with the addition of a packing ring 57. The bolt 53 has a central bore 58 which communicates in the neighborhood of the gland 56 with a cavity 60 from which diverge rearwardly directed conduits 61, (two such conduits are shown in Figure 5) said conduits surrounding the bolt 53 and discharging into a circular chamber 62 from which two passages 63 lead to the friction surfaces of the tapered grooves in the clutch member 8 which form the parts co-operating each with the wedge shaped surfaces of the enlarged end 10a of the intermittently operated clutch member 9a. Said two passages 63 discharge each into one of the two inclined sides of the groove as may be clearly seen from Figure 4 in regard to the left hand clutch member 9a.

The arrangement for the right hand clutch member 9 is exactly the same but this second arrangement is not visible in the drawings except in Figure 2, because it is obscured by the outlets of the clutch member in question.

The outlet of the central bore 58 into the cavity 60 can be kept closed by a needle valve 64 which projects from one side of an arm 65, from the opposite side of which latter another needle valve 66 projects. The needle valve 64 has an enlargement 67 adjacent the arm 65, and a flexible packing washer 68 is positioned between the two parts 64 and 67 within a cavity in the gland 56.

The needle valve 66 forms a part of a device for controlling the exhaust of the fluid and closes the terminal of a central bore 70 in a bolt 71 which is inserted in a shoulder 72 in the oscillating clutch member 8 similar to the shoulder 52. The central bore 70 in the bolt 71 also terminates in a transverse conduit 73 the two ends of which communicate with a circular space 74 which communicates further through two conduits 75 with the sloping side surfaces of the tapered grooves in the respective ends of the clutch member 8 which co-operate with the enlargements 10, 10a of the intermittently operated clutch members 9, 9a as shown in Figure 4 (right hand end). A third conduit 75a not visible in Figure 5, but shown in Figure 4, terminates in the bottom of said tapered groove. Except for the conduit 75a, the bolt 71 with the parts relating thereto such as the tightening members, nuts and the like are substantially the same as those parts described and shown in combination with the bolt 53.

The object of the fluid control devices is to separate the frictional surfaces of the co-operating clutch members, and they are of the same constructional form for the intermittently operative clutch members 9, 9a although Figure 3 shows only those for the clutch member 9 while the corresponding parts for the other clutch member 9a are not illustrated.

The supply and exhaust devices for the pressure medium are regularly spaced around the shaft 1 so that, as shown in Figures 3 and 5, each of the arms 65 is provided on one side with a needle valve 64 for controlling the supply 63 to one of the intermittently operative clutch members 9 or 9a, and on the opposite side with a needle valve 66 for controlling the outlet 75, 75a from the opposite intermittently operative clutch member 9a or 9; thus the distribution of the supply and the exhaust conduits for each individual clutch member 9 or 9a alternates so that for every alternate arm 65 the needle valve 66 with its related parts is positioned on the right-hand side as is Figure 5 but on the left-hand side for the intermediate arms 65.

The conduits 63 and 75 discharge into peripheral oblong recesses 76 and 76a in the inclined side surfaces of the tapered grooves of the clutch member 8, and the recess 77 in the bottom of the groove extends around the whole circumference and is common to all the middle outlet conduits 75a in the corresponding end of the clutch member 8, whereas the recesses 76 in the inclined side surfaces of the grooves occupy only short portions of the circumference, and they are common each for one pair of the side supply conduits 63 as well as for one pair of the side outlet conduits 75 as may be seen from Figure 3.

The arms 65 of the two clutch members 9 and 9a each project radially inwardly from annular plate discs 78, 78a. These plate discs are held between pairs of cushions 79, 79a (Figure 4) and consist of some highly frictional material such as fibre discs or the like. These cushions are confined and pressed with an appropriate pressure against the opposite side surfaces of the discs 78, 78a between screws 81, 81a and an annular plate washer 82, the screws 81, 81a and washers 82 being held by means of interpositioned carrier plates 80, 80a of a conical configuration. In this attaching means the plate discs 78, 78a are arranged to move slightly in the direction of rotation in respect to the clutch member 9, 9a.

Each end of the oscillating clutch member 8 is provided with a flange 84, 84a each of which carries two cushions or annular plates 86, 86a, 87 secured by screws 85 and made of some highly frictional material such as fibre. The plates 86, 86a are angular in cross-section and form brackets for the plate discs 78, 78a and for the other annular plates or cushions 87. At certain points 90 the horizontal flange 88 of the angular plates or cushions 86, 86a is cut away so as to provide space for the radially projecting arms 65. While the cushions 79, 79a are compressed by the screws 81, 81a so firmly about the two sides of their respective annular plate 78, 78a that said plates can move peripherally only when considerable force is exerted, the pressure between the cushions or plates 86, 86a and 87 is lighter so that there is only a very slight distance between them and the corresponding disc 78, 78a.

The clutch operates as follows:

When the shaft 1 is rotated in one direction by the oscillatory motor, the right hand clutch member 9 for instance (on the left hand clutch member 9a as the case may be) owing to the axial pressure from the spring washer 16, is moved to the left (to the right for the left hand clutch member 9a), this movement by means of the screw threads 11 continues until a pressure contact is set up between the wedge shaped enlargement 10 of the clutch member 9 and the inclined side surfaces of the tapered groove in the end facing the oscillating clutch member 8 which causes the clutch member 9 to be rotated. This rotating motion is transferred to the fly wheel rim 17 by the sleeve 12 and the casing 18. Having concluded its cycle, the shaft 1 is turned back by the oscillating engine but now the fly wheel rim 17 will continue to revolve in the first mentioned direction on account of its inertia. Therefore, the co-operation between the two clutch members 8 and 9 must be interrupted instantaneously when the member 8 starts its reverse movement, otherwise the contacting surfaces of the two clutch members would score one another.

This necessary, instantaneous separation of the contacting surfaces is effected in the following way:

During the above-mentioned engagement between the two members 8 and 9, the central bore 58 in each bolt 53 is closed by the needle valve 64, whilst simultaneously the central bore 70 in the opposite bolt 71 is kept open by the needle valve 66 the result of which is that the disc 78 which carries the radial arms 65—as will be explained further below—is moved peripherally to the left as in Figures 3 and 5. Consequently, the pressure medium (compressed air) from the pipe 47 is shut off from the contacting surfaces between the members 8 and 9, while the pressure medium which was previously present between them has escaped through the conduits 75, 75a and 70 when these are opened to the surrounding air. At the same moment as the clutch member 8 reverses its oscillating direction, a slight angular movement occurs between the disc 78 and the clutch member 8 owing to the fact that the grip of the disc 78 between the cushions 79 is such that it will allow a small sliding movement caused by the inertia in the disc 78, and although this angular movement is very small it suffices to change the position of the needle valves 66, 64 to such a degree that the central bore 58 in the various bolts 53 will be opened and the central bore 70 in the various bolts 71 will be closed. Owing to this change, the pressure medium flows from the pipe 47 through the conduits 63 into the co-operating surfaces of the clutch members 8, 9, and forces them apart on account of the greater force exerted by said medium in comparison with the force of the spring washer 16. Simultaneously the conduits 70, 75, 75a will be opened by the needle valve 66 so as to allow the pressure medium between the coacting surfaces at the opposite side of the clutch member 8 and clutch member 9a to escape so that the spring washer 16a is free to force the left hand clutch member 9a into contact with the clutch member 8. When the shaft 1 oscillates in the opposite direction, the left hand clutch member 9a follows the last movement of the clutch member 8, and rotates the flywheel rim 17a in this direction by means of the web 20.

In the next oscillating change of the shaft 1 this movement is repeated which results in a uni-directional rotation of the wheel rim 17 in the one direction and a uni-direction rotation of the wheel rim 17a in the opposite direction. Thus the inertia of the two wheel rims 17 and 17a maintain their opposite revolving motions notwithstanding the intermittent impulses imparted to them from the oscillating clutch member 8 through their respective clutch members 9 and 9a, and without the danger of the parts 8, 9 and 9a seizing or gripping when moving in opposite directions.

The rotation of the wheel rims 17, 17a is transferred to the members which act upon the driven shaft 2 so that said shaft will revolve uni-directionally. These members are not shown or designated in the drawings except the casing 21 within which the various moving parts are enclosed.

Although the clutch has been illustrated and described as double-ended, that is, provided with an intermittently operative clutch member 9 or 9a with related parts and flywheel masses on each end of the oscillatory clutch member 8, the invention is obviously not confined to double-ended members since the oscillatory movements can be converted into a uni-directional revolving motion by the use of a single intermittently operated clutch member 9 or 9a only. Such an arrangement, however, would create heavy unbalanced stresses which tend to twist the whole system in a direction opposite to that of the single clutch member's operative movement, necessitating exceptionally strong fixing means. The double-ended embodiment does not require such means and the entire arrangement runs smoothly and noiselessly. Furthermore, the double-ended arrangement has the considerable advantage that the operative rotation of the clutch members at the one end will assist the release of the clutch members at the opposite end, and thus the danger of objectionable gripping between the two coupling members is reduced when these revolve in opposite directions.

The constructive design of the various parts may be modified in various ways within the scope of the present invention and the application of this invention is not restricted to any particular machines, but as already stated it is applicable to all cases where it is necessary to convert oscillatory movement into uni-directional rotating movement.

What I claim is:

1. In combination, an oscillating driving clutch member, driven clutch members adapted to cooperate with the driving clutch member, means to intermittently and alternately engage the driven clutch members with the driving clutch member in dependence on the oscillating movement of the driving clutch member, and fluid pressure means to intermittently disengage the driven clutch members from the driving clutch member.

2. In combination, an oscillating driving clutch member, driven clutch members adapted to cooperate with the driving clutch member, means to intermittently and alternately engage the driven clutch members with the driving clutch member in dependence on the oscillating movement of the driving clutch member, means for admitting pressure fluid between the engaged portions of one of the driven clutch members and the driving clutch member to disengage the latter during the period while the other driven clutch member is engaged with the driving clutch member, means for exhausting the pressure fluid at the reversal of the direction of movement of the driving clutch member.

3. In combination, an oscillating driving clutch member, driven clutch members, means for intermittently engaging the respective driven clutch members with the driving clutch member in dependence on the direction of oscillation of the driving clutch member, means for admitting fluid pressure to the point of engagement of one of said driven clutch members and the driving clutch member to disengage said clutch members at the moment of reversal of motion of the driving clutch member, and means to exhaust the fluid pressure at the next succeeding reversal of movement of the driving clutch member.

4. An arrangement as claimed in claim 3, characterized in that said fluid pressure admitting means are constituted by valves, and means operated upon reversal of motion of the driving clutch member to actuate said valves.

5. An arrangement as claimed in claim 3, characterized in that said fluid pressure admitting and exhausting means include valves controlling the admission and exhaust of the pressure fluid, and means operated upon reversal of motion of the driving clutch member to actuate said valves.

6. An arrangement as claimed in claim 3 characterized in that said fluid pressure and exhausting means include a group of valves associated with each driven clutch member, actuating means for the groups of valves operated in dependence upon the reversal of movement of said driving clutch member.

7. An arrangement as claimed in claim 3 characterized in that said fluid pressure admitting and exhausting means include admitting and exhausting valves for each driven clutch member, a friction coupling between the driving clutch member and each driven clutch member, and means actuated in dependence upon the relative movement between said driving clutch member and said friction coupling means to actuate said valves.

8. An arrangement as claimed in claim 3 characterized in that said fluid pressure admitting and exhausting means includes admission and exhaust valves for each driven clutch member, a control member common to each two admission and exhaust valves, and a friction coupling between each driven clutch member and the driving clutch member and accommodating slight relative displacement of said clutch members, and means connecting said friction coupling means with said valve control member for controlling said valves in dependence upon the relative movement between the friction coupling means and the driving clutch member.

9. An arrangement as claimed in claim 3 characterized in that said fluid pressure admitting and exhausting means include admission and exhaust valves for each driven clutch member, a control member common to each two admission and exhaust valves, and a friction coupling between each driven clutch member and the driving clutch member and accommodating slight relative displacement of said clutch members, and means connecting said friction coupling means with said valve control member for controlling said valves in dependence upon the relative movement between the friction coupling means and the driving clutch member, said valves including members adjustable with respect to the control member.

10. An arrangement as claimed in claim 3 characterized in that the admission of pressure fluid is continued throughout the period of disengagement of each driven clutch member whereby a cushioning film of fluid is maintained between the clutch members during this engagement.

OSCAR HANSSON.